Feb. 4, 1964 R. ANDRIEU 3,120,576

STABILIZATION OF MAGNETICALLY RECORDED COLOR TELEVISION SIGNALS

Filed Jan. 5, 1959

Inventor:
Robert Andrieu
By [signature]
Patent Agent

United States Patent Office 3,120,576

Patented Feb. 4, 1964

3,120,576

STABILIZATION OF MAGNETICALLY RECORDED COLOR TELEVISION SIGNALS

Robert Andrieu, Ulm (Danube), Germany, assignor to Telefunken Aktiengesellschaft, Berlin, Germany Filed Jan. 5, 1959, Ser. No. 784,993
Claims priority, application Germany Jan. 4, 1958
2 Claims. (Cl. 178—5.4)

Figures 1, 2:
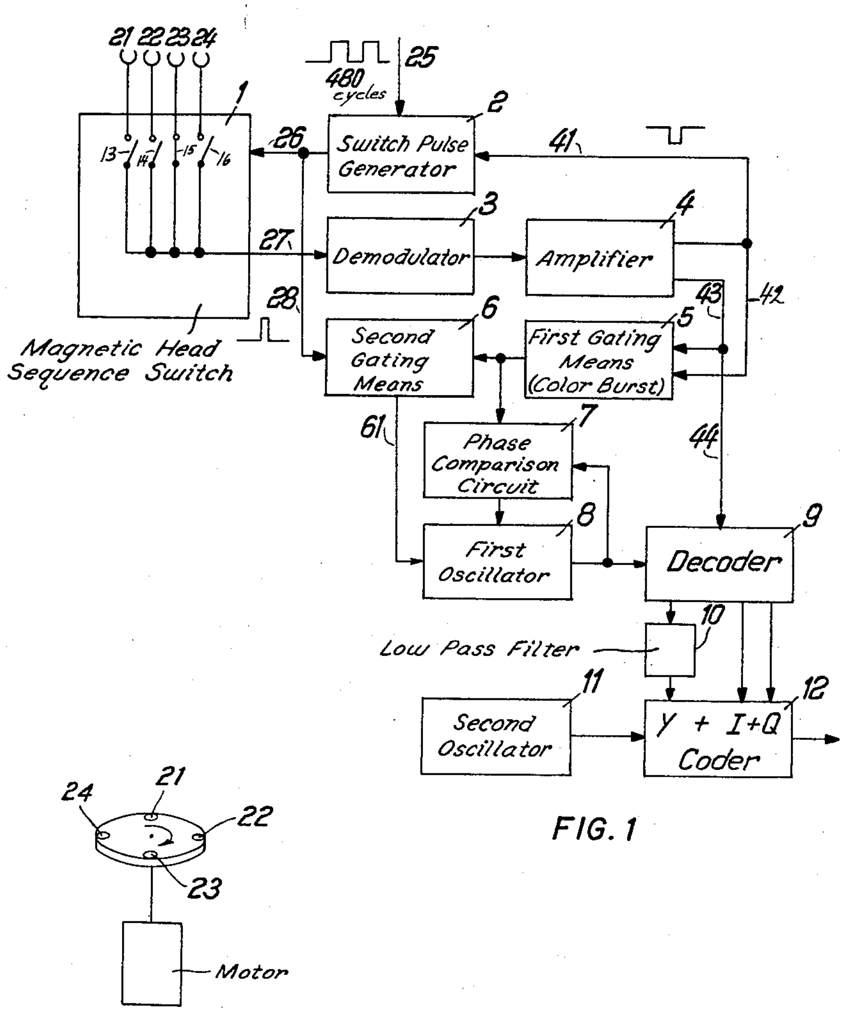

The present invention relates to the processing of composite signals and, more particularly, to the processing of television signals.

A method of recording video signals is known under the name "Ampex Method," according to which recording tracks containing the intelligence are disposed transversely to the direction of travel of the record carrier. In this case, the recording and scanning of the video signals is carried out by means of a plurality of magnetic heads which are sequentially brought into operative relation with the record carrier. An electronic switch successively switches from one magnetic head to the next during the interval between successive lines of the television raster, so that the disturbances occuring during the change-over will not become visible in the picture reproduced. Details of the recording and reproducing methods and of the circuits employed are described in a series of articles under the title "Video Tape Recorder Design," in the Journal of the SMPTE, volume 66, No. 4, of April 1956, pages 177 to 188.

It is an object of the present invention to use the aforementioned method for recording and reproducing of color television signals according to the NTSC (National Television System Committee) standard, whereby the requirements in the mechanical precision of the apparatus need not be raised above those necessary for black and white reproduction. In case of the NTSC standard, the color signal, in the form of two color signals I and Q added to the brightness signal Y, is modulated on an auxiliary color carrier with a mutual phase shift of 90°, and the resulting modulated signal, the frequency range of which is within the frequency band provided for the brightness modulation, is modulated together with the brightness signal Y on a carrier frequency. Likewise, as in the case of the Ampex method, the video signal is previously modulated on a carrier by frequency modulation rather than diirectly recorded on the recording carrier. If the same method is to be used for the recording of color television signals, difficulties will occur in the reproduction, because the phase relation between the auxiliary color carrier to be reintroduced into the receiver and the color signals I and Q, modulated in the transmitter on the respective auxiliary color carrier, will disappear when switching from one reproducing head to the next, unless great care is taken to ensure an extraordinarily precise adjustment of the mutual spacing among the magnetic heads on the rotating cylinder. Assuming a maximum permissible phase shift of 10°, according to FCC standards, it can be calculated that the length of the trace for one line group of 16 lines (by way of example) on the recording carrier and the head spacing at the periphery of the cylinder have to correspond to 0.3 $\mu$m. Such precision cannot be obtained without inordinate expense. Therefore, when scanning a color recording with an apparatus suitable for black and white reproduction, a composite color video signal is obtained in which the phase of the auxiliary color carrier has an indeterminate jump after a number of lines. Consequently, it would be necessary to readjust the phase condition of the auxiliary color carrier locally generated in the reproducing apparatus suddenly, each time during the reception of a color video signal transmitted from a recording produced according to the Ampex method when the change-over takes place from one scanning head to the next. This would greatly increase the manufacturing expense of the color television receivers which are conventionally synchronized by means of a color carrier frequency generated by flywheel synchronization in a known manner with the aid of color synchronizing pulses during the line return sweeps.

It is an object of the present invention to reproduce a composite color television signal from the scanned color television signal in which the color carrier frequency phase shifts each time the heads are switched, i.e., to provide a color television signal in which these phase shifts do not occur.

It is another object of the invention to provide two color carrier oscillators in a system for obtaining a composite color television signal from a magnetic recording in which several tracks contain the total information of a number of picture lines recorded on a signal carrier and brought into cooperation with several tracks of the recording carrier successively, whereby the first of said color carrier oscillators is frequency-controlled by the color synchronizing pulses derived from the signal recording; and whereby said color carrier oscillator is additionally phase-corrected by each first color synchronizing pulse occurring on the recording track; and whereby the second color carrier oscillator is synchronized by means of a locally produced fixed frequency; and whereby the output current of the first color carrier oscillator is supplied to a decoder to obtain the brightness signals Y and the color signals I and Q; and whereby the output current of the second color carrier oscillator is fed to a coding means to reestablish the composite color television signal from the signals Y, I and Q obtained in the decoder.

Still further objects and the entire scope of applicability of the present invention will become apparent from the detailed description given hereinafter; it should be understood, however, that the detailed description and specific example, while indicating the preferred embodiment of the invention, is given by way of illustration only, since various changes and modifications within the spirit and scope of the invention will become apparent to those skilled in the art from this detailed description.

The drawing illustrates schematically an embodiment of the invention, FIGURE 1 being similar to FIGURE 4, on page 180, of the mentioned article in "Journal of the SMPTE," volume 66, No. 4, of April 1956, and FIGURE 2 being an illustration of a rotating cylinder carrying the reading and writing heads.

Referring in detail to the drawing, FIGURE 1 shows a block 1 of switching devices 13, 14, 15 and 16 which operates under the control of pulses from a switching pulse generator 2 to sequentially connect reading and writing heads 21, 22, 23 and 24 to a frequency demodulator 3 by a line 27. The heads 21, 22, 23 and 24 are mounted on a motor-driven rotating cylinder, as shown diagrammatically in FIGURE 2. A generally rectangular signal of approximately 480 cycles per second (although this signal may be of any suitable frequency), derived from the drive for the cylinder carrying the reading and writing heads, is applied through line 25 to the switching pulse generator 2 to determine the time at which the switches of the block 1 are operated. These rectangular signals are timed so that operation of the switches 13, 14, 15 and 16 occurs when the current supplied thereto is at a minimum, and they produce a switching rate of approximately 960 times per second. If the heads 21 to 24 are used to scan a recorded standard television signal of 30 frames per second and 525 lines per frame, the rates of switching are not constant, since switching will occur after 16 lines have been scanned in one case and after 17 lines have been scanned in another.

The demodulator 3 demodulates the signals transmitted from the heads 21 to 24 and feeds its output to an amplifier 4 in which the demodulated video signal is amplified and from which line synchronizing pulses are obtained. The line synchronizing pulses from the amplifier are applied to the switching pulse generator 2 to synchronize the operation of the switches 13 to 16 with the lines scanned by the heads 21 to 24, and also to a gating circuit 5 via a line 42. The video signal output from amplifier 4 is also applied via line 43 to the input of the gating circuit 5 which is arranged to derive the color synchronizing pulses from the composite video signal. As has been known, the color synchronizing pulses comprise the frequency of the color carrier. The video output from the amplifier 4 is also applied via a line 44 to the input of a decoder 9 in which the brightness signal Y and the color signals I and Q are derived, in a manner known per se, from the composite video signal by using the signal from a local auxiliary carrier frequency oscillator 8. This oscillator 8 is controlled by a phase comparison circuit 7 which compares the output from the oscillator 8 with the output of the gating circuit 5 to obtain a control voltage corresponding to the phase differences between the two. This control voltage is utilized to control the frequency of the oscillator 8.

Since, as mentioned in the foregoing, an uncontrollable phase shift in the auxiliary color carrier of the video signal occurs at each switching from one head to the next, such a system would not operate satisfactorily, because any resulting phase shift of the I and Q signals which occurs at each switching operation would cause incorrectly reproduced colors. Therefore, it is necessary to readjust the phase of the color carrier oscillator 8 each time one of the heads 21 to 24 is switched to the next. This is accomplished by always feeding the first color synchronizing pulse occurring after switching in such a manner, that the color carrier oscillator 8 is instantaneously synchronized by this color pulse. Such phase correction must be carried out in such a way that the frequency of the oscillator 8 is not influenced. This is done by introducing the first color pulse of a line group into the feedback path of the color oscillator with a high amplitude. A second gating circuit 6 serves to obtain this first color pulse at each switching operation, all of the color synchronizing pulses from the gating circuit 5 being fed to this second gating circuit 6. The switching pulses obtained from the switching pulse generator 2 and supplied via a line 28 are used to gate the first color synchronizing pulse, or color burst, occurring after one of such switching pulses, and the output of the gating circuit 6 is fed to the color carrier oscillator 8 via a line 61.

A coding means 12 is provided for reforming the composite color television signal, a new color signal being formed from the recovered I and Q signals obtained in the decoder 9 and a second carrier frequency signal generated by means of a second, preferably quartz-controlled, color carrier oscillator 11, said color signal having the constant phase of the auxiliary color carrier. By adding the Y signal, the complete composite color television signal is obtained. A low pass filter 10 for limiting the upper frequency limit of the Y signal can be inserted in the feedline for the Y signal from the decoding means 9 to the coding means 12.

In order to assure foolproof operation of the apparatus, i.e., a proper relation between auxiliary color carrier, line and frame change frequencies, the drive motor for the rotating cylinder carrying the heads should also be suitably synchronized with the same quartz-controlled oscillator which generates the new auxiliary color carrier frequency.

I claim:

1. A system for recovering color television signals including color carrier synchronizing signals and line synchronizing information from a longitudinally moving recording medium on which said color signals are recorded as suppressed carrier modulated signals on parallel recording tracks extending substantially transversely of the medium, in which system reproducing heads are switched during the return traces of picture lines, said system comprising: a plurality of reproducing heads; rotary means carrying said heads for synchronizing the advance of the medium and for advancing the heads transversely one at a time in cyclic sequence across the recording medium and delivering a switching pulse for each change of one head for the next in sequence; switch means connected with each head and cyclically closed by said switching pulses at the next occurring return trace; amplifier and demodulator means connected with said switch means and delivering said modulated color signals and line synchronizing pulses; a local oscillator for generating an auxiliary color carrier and including oscillator phase comparison and frequency control means; first color-carrier-synchronizing signal gating means connected to be controlled by line pulses for delivering color carrier synchronizing signals for every line, said color carrier synchronizing signals being applied to said phase comparison and frequency control means for correcting the frequency of said oscillator as well as to a second color carrier synchronizing signal gating means controlled by said switching pulses and connected to deliver the first color carrier synchronizing signal after each switching pulse to said oscillator for instantaneously changing its phase; and decoder means connected with the demodulator means to receive said modulated color signals and connected with the oscillator to receive a phase-controlled carrier to be combined therewith and said decoder delivering the recovered color signals after demodulation and video brightness signals.

2. In a system as set forth in claim 1, a second oscillator generating a second carrier signal stabilized substantially at the frequency of the auxiliary carrier; a coder connected with the second oscillator and with the decoder and remodulating the color and brightness signals on the second carrier thereby producing a complete color television signal on a carrier free of phase shift.

References Cited in the file of this patent

UNITED STATES PATENTS

| | | |
|---|---|---|
| 2,892,017 | Houghton | June 23, 1959 |
| 2,892,022 | Houghton | June 23, 1959 |
| 2,921,976 | Johnson | Jan. 16, 1960 |
| 2,979,562 | Leyton | Apr. 11, 1961 |

OTHER REFERENCES

Technical Notes on the Ampex VR-1000 published by Ampex Corp. Oct. 3, 1958, page 9.

Video Tape Recorder, Electronics, August 1957, pp. 138–144.